(12) United States Patent
Liu et al.

(10) Patent No.: US 8,274,035 B2
(45) Date of Patent: Sep. 25, 2012

(54) PHOTOSENSOR CIRCUIT HAVING A LEVEL SHIFTING CIRCUIT FOR BIASING A FIRST NODE WITH AN OPERATION VOLTAGE SIGNAL AND A PHOTOTRANSISTOR FOR MODULATING THE LEVEL OF THE OPERATION VOLTAGE SIGNAL

(75) Inventors: Shou-En Liu, Hsinchu (TW); Yung-Hui Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 429 days.

(21) Appl. No.: 12/712,301

(22) Filed: Feb. 25, 2010

(65) Prior Publication Data
US 2011/0073749 A1    Mar. 31, 2011

(30) Foreign Application Priority Data
Sep. 30, 2009 (TW) .............................. 98133155 A

(51) Int. Cl.
*H01J 40/14* (2006.01)

(52) U.S. Cl. ................... 250/214 R; 250/205

(58) Field of Classification Search .............. 250/214 R, 250/214.1, 205; 356/218–224; 327/514
See application file for complete search history.

(56) References Cited

U.S. PATENT DOCUMENTS

| 6,819,781 B1 * | 11/2004 | Simpkins ...................... 382/112 |
| 6,844,897 B1 | 1/2005 | Andersson |
| 6,858,912 B2 | 2/2005 | Marshall et al. |

* cited by examiner

*Primary Examiner* — Que T Le
(74) *Attorney, Agent, or Firm* — Thomas|Kayden

(57) ABSTRACT

A photosensor circuit including a first node, a level shifting circuit, a phototransistor and an inverter is provided. The first node has an operation voltage signal. The level shifting circuit is coupled to the first node for biasing the first node, so that the operation voltage signal is biased to an operation biasing level. The phototransistor is coupled to the first node for receiving an optical signal and accordingly generates a first electrical signal by means of controlling the level of the operation voltage signal. The inverter receives the first electrical signal and accordingly generates and outputs a second electrical signal, which indicates the intensity of the optical signal.

13 Claims, 3 Drawing Sheets

PHOTOSENSOR CIRCUIT HAVING A LEVEL SHIFTING CIRCUIT FOR BIASING A FIRST NODE WITH AN OPERATION VOLTAGE SIGNAL AND A PHOTOTRANSISTOR FOR MODULATING THE LEVEL OF THE OPERATION VOLTAGE SIGNAL

This application claims the benefit of Taiwan application Serial No. 98133155, filed Sep. 30, 2009, the subject matter of which is incorporated herein by reference.

BACKGROUND OF THE INVENTION

1. Field of the Invention

The invention relates in general to a photosensor circuit, and more particularly to a photosensor circuit implemented with a phototransistor.

2. Description of the Related Art

Nowadays, technology capable of detecting the intensity of light is well developed. Conventionally, photosensing elements in photosensor are implemented with photodiodes. In general, photodiodes is made with high temperature manufacturing processes. In other words, the conventional technology which uses photodiode as photosensing elements is not compatible with ordinary manufacturing process of thin film transistor (TFT) and incurs higher manufacturing cost. Therefore, how to develop photosensors implemented with other semiconductor elements as photosensing elements has became a prominent task for the industries.

SUMMARY OF THE INVENTION

The invention is directed to a photosensor circuit, which employs phototransistor as photosensing element and employs an amplifier implemented with an inverter for amplifying an electrical signal, which is generated by the phototransistor in response to a sensed optical signal. Thus, in comparison with conventional photosensors, the photosensor circuit directed by the present invention can be manufactured with lower temperature process and lower cost, compatible with ordinary thin film transistor (TFT) manufacturing processes, and can be implemented on a flexible plastic substrate.

According to a first aspect of the present invention, a photosensor circuit including a first node, a level shifting circuit, a phototransistor and an inverter is provided. The first node has an operation voltage signal. The level shifting circuit is coupled to the first node for biasing the first node, so that the operation voltage signal is biased to an operation biasing level. The phototransistor is coupled to the first node for receiving an optical signal and accordingly generates a first electrical signal by means of controlling the level of the operation voltage signal. The inverter receives the first electrical signal and accordingly generates and outputs a second electrical signal, which indicates the intensity of the optical signal.

The invention will become apparent from the following detailed description of the preferred but non-limiting embodiments. The following description is made with reference to the accompanying drawings.

DETAILED DESCRIPTION OF THE INVENTION

The relevant photosensor circuits according to the present embodiment of the invention use phototransistors as photosensing elements.

Figure 1:
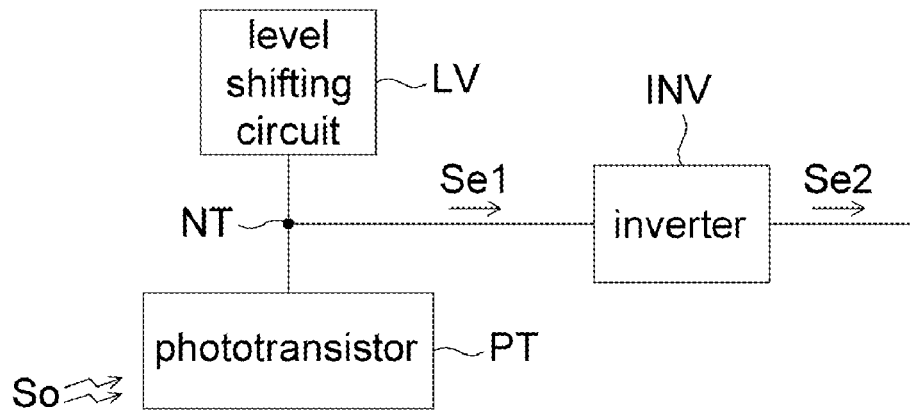
FIG. 1 shows a block diagram of a photosensor circuit according to an embodiment of the invention.

Referring to FIG. 1, a block diagram of a photosensor circuit according to an embodiment of the invention is shown. The photosensor circuit 1 includes a node NT, a level shifting circuit LV, a phototransistor PT and an inverter INV. The node NT has an operation voltage signal. The level shifting circuit LV is coupled to the node NT for biasing the node NT, so that the operation voltage signal is corresponding to an operation bias level within a linear operation region of the inverter INV.

The phototransistor PT is coupled to the node NT for receiving an optical signal So and accordingly generating an electrical signal Se1 by means of modulating the level of the operation voltage signal. The inverter INV receives and amplifies the electrical signal Se1 to generate and output an electrical signal Se2, which indicates the intensity of the optical signal So. For example, the operation bias level corresponds to the linear operation region of the inverter INV, so that a photosensor circuit employing a phototransistor PT as the photosensing element can be realized by the photosensor circuit 1 according to the present embodiment of the invention. A number of embodiments are disclosed below for more detailed description of elements of the photosensor circuit 1 according to the present embodiment of the invention.

First Embodiment

Figure 2:
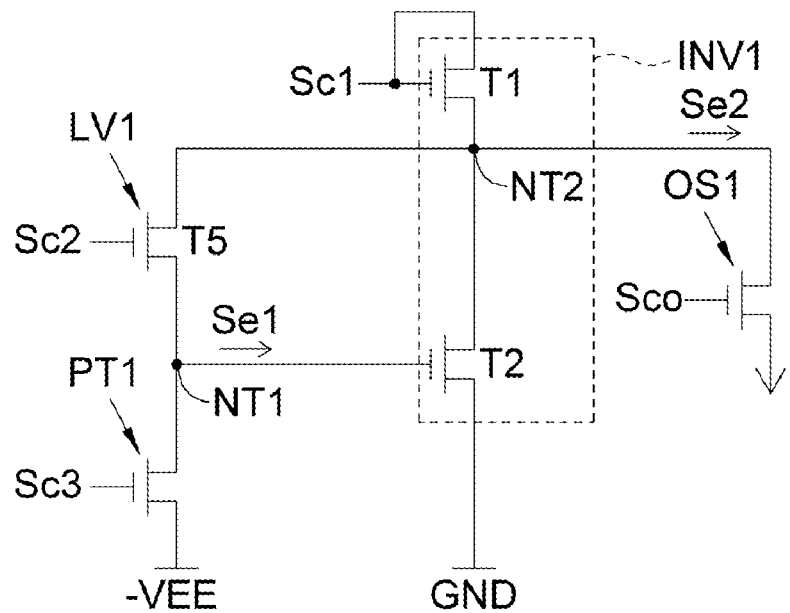
FIG. 2 shows a circuit diagram of a photosensor circuit according to a first embodiment of the invention.

Referring to FIG. 2, a circuit diagram of a photosensor circuit according to a first embodiment of the invention is shown. The photosensor circuit 2 includes a node NT1, a level shifting circuit LV1, a phototransistor PT1 and an inverter INV1, wherein the node NT1 has an operation voltage signal.

For example, the active layer of the phototransistor PT1 is made with amorphous silicon or organic semiconductor, and the phototransistor can be implemented on a flexible plastic substrate. The level shifting circuit LV1 and the inverter INV1 are both implemented by transistors. For example, the transistors of the level shifting circuit LV1 and the inverter INV1 are implemented by metal-oxide thin film transistors.

The inverter INV1 includes a node NT2, and transistors T1 and T2. The node NT2 has an electrical signal Se2. The drain and the gate of the transistor T1 receive a control signal Sc1, and the source of the transistor T1 is coupled to the node NT2. On the part of the transistor T2, the drain is coupled to the node NT2, the gate is coupled to the node NT1, and the source receives a reference voltage signal. For example, the reference voltage signal is a ground voltage signal GND.

The level shifting circuit LV1 includes a transistor T5, wherein the drain of the transistor T5 is coupled to the node NT2, the gate of the transistor T5 receives a control signal Sc2, and the source of the transistor T5 is coupled to the node NT1.

The drain of the photodiode PT1 is coupled to the node NT1, the gate of the photodiode PT1 receives a control signal Sc3, and the source of the photodiode PT1 receives another reference voltage signal. For example, the another reference voltage signal corresponds to a negative voltage signal −VEE.

Figure 3:
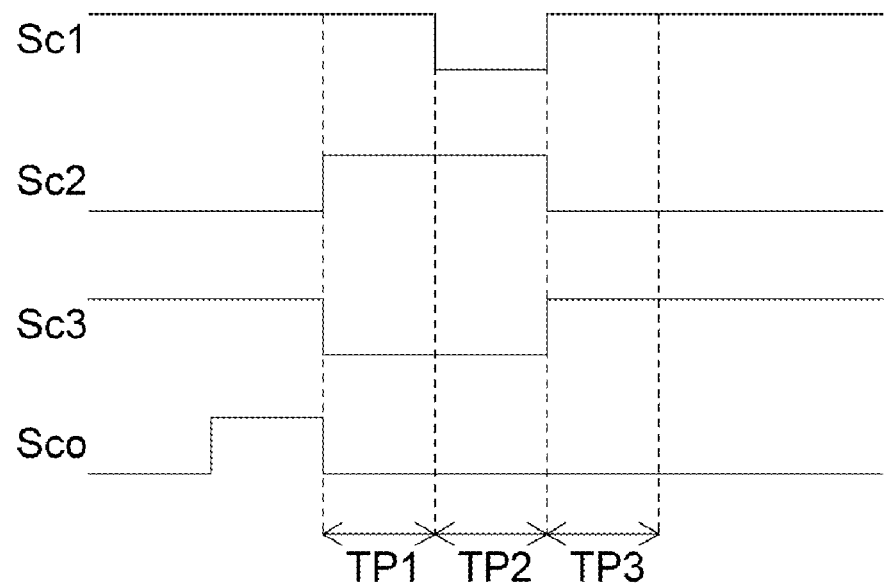
FIG. 3 shows a timing diagram of each relevant signal of FIG. 2.

Referring to FIG. 3, a timing diagram of each relevant signal of FIG. 2 is shown. In an example, under the control of the control signals Sc1-Sc3, the level shifting circuit LV1 is driven for biasing the operation voltage signal to the operation biasing level in the operation periods TP1-TP3.

In the operation period TP1, the control signals Sc1 and Sc2 correspond to an enabling level, such as a high signal level, and the control signal Sc3 corresponds to a disabling level, such as a low signal level. Thus, the transistors T1 and T5 are respectively turned on in response to the control signals Sc1 and Sc2. The phototransistor PT1 is turned on in response to the control signal Sc3 and accordingly generates a photosensor current, which can be neglected in comparison to the conducting currents of the transistors T1 and T5. In other words, the node NT1 can be regarded as being open circuit. Thus, the operation voltage signal on the node NT1 is biased to be close to the enabling level of the control signal Sc1 in the operation period TP1. For example, the enabling level of the control signal Sc1 is the power supplying signal level VDD of the photosensor circuit 2.

In the operation period TP2, the control signals Sc2 and Sc3 keep the enabling level and the disabling level respectively, and the control signal Sc1 is converted from the enabling level to the disabling level. Thus, the transistor T1 is cut off, the transistors T2 and T5 are turned on, and the phototransistor PT1 remains the same operation as in the operation period TP1. Thus, a discharge path is implemented with the transistors T5 and T2 for discharging the operation voltage signal on the node NT1 to a bias level. Since the operation voltage signal is also provided to the gate of the transistor T2, the bias level is, for example, close to the threshold voltage of the transistor T2.

In the operation period TP3, the levels of control signals Sc1 and Sc3 are converted from the disabling level to the enabling level, and the level of the control signal Sc2 is converted from the enabling level to the disabling level. Thus, the transistors T1 and T2 are turned on, so as to implement an inverter circuit. The transistor T5 is cut off, so that the node NT1 is substantially floating. Besides, there is a parasitic capacitor between the gate and the drain of the phototransistor PT1, so that when the control signal Sc3 is converted to a high signal level from a low signal level in the operation period TP3, the level (equal to the foregoing bias level) of the operation voltage signal on the floating node NT1 is further boosted up by a difference voltage $\Delta V$ due to the capacitance coupling effect between the drain and the gate of the phototransistor PT1, so that the level of the operation voltage signal is substantially equal to the operation biasing level.

Figure 4:
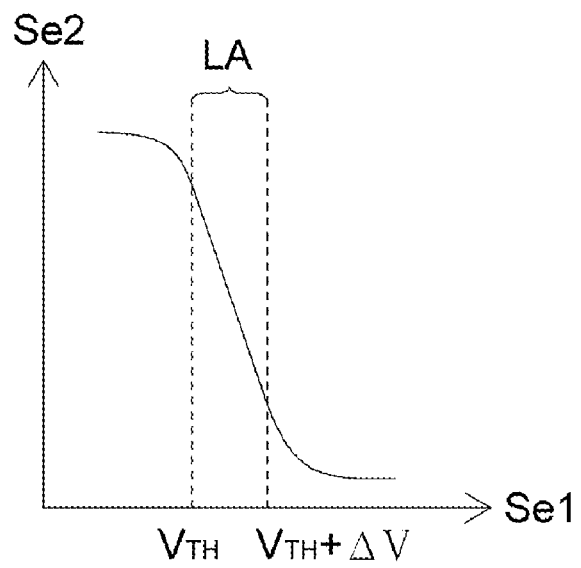
FIG. 4 shows an operation curve of the inverter INV1 of FIG. 2.

Referring to FIG. 4, an operation curve of the inverter INV1 of FIG. 2 is shown. Considering the operation curve of the inverter INV1 from the aspect of the input signal (i.e. the horizontal axis), the lower bound of the linear operation region LA of the inverter INV1 is close to the threshold voltage $V_{TH}$ of the transistor T2. Thus, the level shifting circuit LV1 can be used to bias the operation voltage signal on the node NT1 to be close to the threshold voltage $V_{TH}$ in the second operation period TP2. In the operation period TP3, the operation voltage signal can be further boosted by a difference voltage $\Delta V$ from the threshold voltage $V_{TH}$, i.e. boosted as a voltage $V_{TH}+\Delta V$, due to the capacitance coupling effect between the drain and the gate of the phototransistor PT1. Thus, the level of the operation voltage signal on the node NT1 can be biased in the linear operation region LA of the inverter INV1 by means of adjusting the difference, which determines the magnitude of the difference voltage $\Delta V$, between the enabling level and the disabling level of the control signal Sc3.

After the operation period TP3, the operation voltage signal is biased in the linear operation region LA of the inverter INV1. Next, the phototransistor PT1 receives an optical signal and accordingly generates a photosensor current for determining the level of the operation voltage signal, so as to generate an electrical signal Se1.

In an example, the photosensor circuit 2 further includes an output switch OS1, which is turned on in response to an output control signal Sco for outputting an electrical signal Se2 on the node NT2. In an example, the photosensor circuit 2 is used for implementing a photodetector pixel circuit, wherein multiple photosensor circuits can be arranged as an array.

Figure 5:
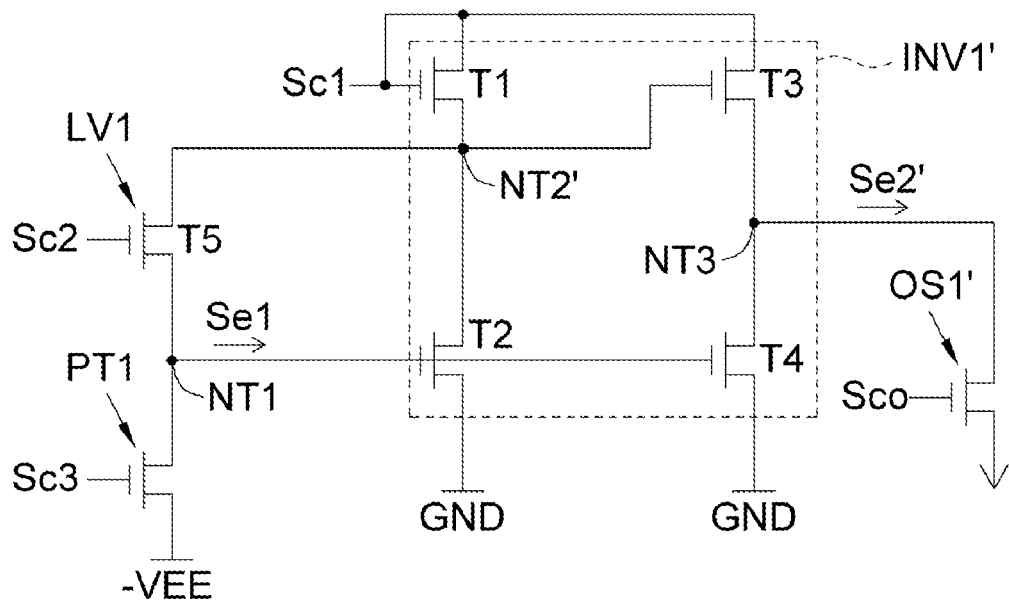
FIG. 5 shows a circuit diagram of another photosensor circuit according to a first embodiment of the invention.

Though only the situation that the photosensor circuit 2 has a circuit structure as indicated in FIG. 2 is illustrated in the present embodiment of the invention, the photosensor circuit 2 according to the present embodiment of the invention is not limited thereto. In other example, the photosensor circuit according to the present embodiment of the invention could include an inverter INV1' with circuit structure shown in FIG. 5. In this present example, the inverter INV1' further includes a node NT3 and transistors T3 and T4.

The drain of the transistor T3 receives a control signal Sc1, the gate of the transistor T3 is coupled to the node NT2, and the source of the transistor T3 is coupled to the node NT3. The drain of the transistor T4 is coupled to the node NT3, the gate of the transistor T4 is coupled to the node NT1, and the source of the transistor T4 receives a grounding voltage signal GND. Compared with the inverter INV1, the inverter INV1' has greater gain and can be used for obtaining a larger electrical signal Se2' according to the electrical signal Se1.

Second Embodiment

Figure 6:
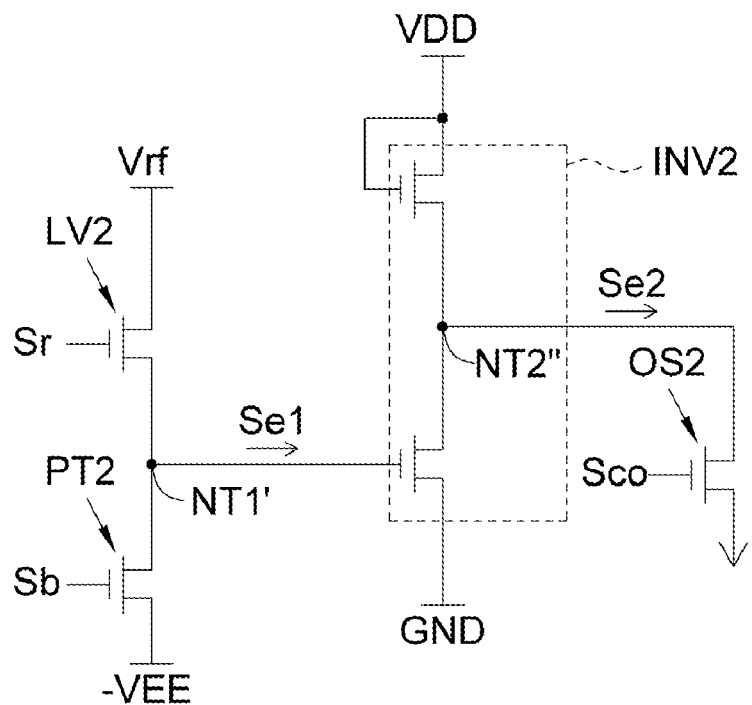
FIG. 6 shows a circuit diagram of a photosensor circuit according to a second embodiment of the invention.

Referring to FIG. 6, a circuit diagram of a photosensor circuit according to a second embodiment of the invention is shown. The photosensor circuit 4 according to the present embodiment of the invention is different from the photosensor circuit of the first embodiment in that the drain of the level shifting circuit LV2 is not coupled to the node NT2" but receives a bias signal Vrf instead. Thus, the level shifting circuit LV2 directly receives the reset voltage signal Sr via the gate and is accordingly turned on to bias the operation voltage signal on the node NT1' to the level of the input signal bias signal Vrf without using the timing control of the control signals Sc1-Sc3.

The photosensor circuits according to the above embodiments of the invention employ phototransistors as photosensing elements, and employ amplifiers implemented with inverters for amplifying electrical signals generated by the phototransistors in response to the sensed optical signals. Thus, in comparison with the conventional photosensor circuit, the photosensor circuits according to the above embodiments of the invention are advantageously manufactured with lower temperature process and lower cost, compatible with ordinary thin film transistor (TFT) manufacturing processes, and can be implemented on a flexible plastic substrate.

The photosensor circuits according to a part of the above embodiments of the invention employ level shifting circuits capable of biasing the input signal of an inverter to an operation biasing level, which is equal to a threshold voltage of an input transistor of the inverter plus a difference voltage. Thus, the photosensor circuits according to the part of the above embodiments of the invention can bias the operation point of the input voltage signal of the inverter to be in the linear operation region of the inverter, despite that the operation curve of the inverter may shift due to manufacturing process factors. Thus, the photosensor circuits according to the part of the above embodiments of the invention can effectively prevent the situation that the operation point of the input voltage signal fall outside the linear operation region of the inverter and accordingly generate an erroneously amplified electrical signal.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A photosensor circuit, comprising:
   a first node, having an operation voltage signal;
   a level shifting circuit, coupled to the first node for biasing the first node, so that the operation voltage signal is biased to an operation biasing level;
   a phototransistor, coupled to the first node for receiving an optical signal and accordingly generating a first electrical signal by means of modulating the level of the operation voltage signal; and
   an inverter, for receiving the first electrical signal and accordingly generating and outputting a second electrical signal, which indicates the intensity of the optical signal.

2. The photosensor circuit according to claim 1, wherein the inverter comprises:
   a second node, having the second electrical signal;
   a first transistor, wherein a first input end and a control end of the first transistor receive a first control signal, and a second input end of the first transistor is coupled to the second node; and
   a second transistor, wherein a first input end of the second transistor is coupled to the second node, a control end of the second transistor is coupled to the first node, and a second input end of the second transistor receives a reference voltage signal.

3. The photosensor circuit according to claim 2, wherein the inverter further comprises:
   a third node, having the second electrical signal;
   a third transistor, wherein a first input end of the third transistor receives the first control signal, a control end of the third transistor is coupled to the second node, and a second input end of the third transistor is coupled to the third node; and
   a fourth transistor, wherein a first input end of the fourth transistor is coupled to the third node, a control end of the fourth transistor is coupled to the first node, and a second input end of the fourth transistor receives the reference voltage signal.

4. The photosensor circuit according to claim 3, further comprising:
   an output switch, turned on in response to an output control signal for outputting the second electrical signal on the third node.

5. The photosensor circuit according to claim 2, wherein the level shifting circuit comprises:
   a fifth transistor, wherein a first input end of the fifth transistor is coupled to the second node, a control end of the fifth transistor receives a second control signal, and a second input end of the fifth transistor is coupled to the first node.

6. The photosensor circuit according to claim 5, wherein:
   in a first operation period, the first and the fifth transistors are respectively turned on in response to the first and the second control signals, so that the operation voltage signal is controlled to be corresponding to the level of the first control signal;
   in a second operation period, the first transistor is cut off in response to the first control signal and the fifth transistor is turned on in response to the second control signal, so that the operation voltage signal is controlled to be corresponding to a bias level, which is related to a threshold voltage of the second transistor; and
   in a third operation period, the first transistor is turned on in response to the first control signal and the fifth transistor is cut off in response to the second control signal, so that the first node is substantially floating.

7. The photosensor circuit according to claim 6, wherein a first input end of the phototransistor is coupled to the first node, a control end of the phototransistor receives a third control signal, which is converted from a low signal level to a high signal level in the third operation period, and the operation voltage signal is boosted from the bias level to a operation bias level in the third operation period by means of capacitance coupling effect between the first input end and the control end of the phototransistor.

8. The photosensor circuit according to claim 7, wherein the level of the operation voltage signal biased to the operation biasing level is determined by a photosensing current, which is generated by the phototransistor, so that the first electrical signal can be generated with the phototransistor.

9. The photosensor circuit according to claim 2, further comprising:
   an output switch, turned on in response to an output control signal for outputting the second electrical signal on the second node.

10. The photosensor circuit according to claim 1, wherein the level shifting circuit comprises:
    a fifth transistor, wherein a first input end of the fifth transistor receives a bias signal, a control end of the fifth transistor receives a replacement voltage signal, and a second input end of the fifth transistor is coupled to the first node.

11. The photosensor circuit according to claim 1, wherein the photosensor circuit is used for implementing a photodetector pixel circuit.

12. The photosensor circuit according to claim 1, wherein the active layer of the phototransistor is made with amorphous silicon or organic semiconductor.

13. The photosensor circuit according to claim 1, wherein the level shifting circuit and the inverter are implemented with metal-oxide thin film transistors.

* * * * *